Sept. 8, 1942.    J. R. JERMAN    2,295,345
AIRPLANE COCKPIT ENCLOSURE
Filed Nov. 4, 1940    3 Sheets-Sheet 1
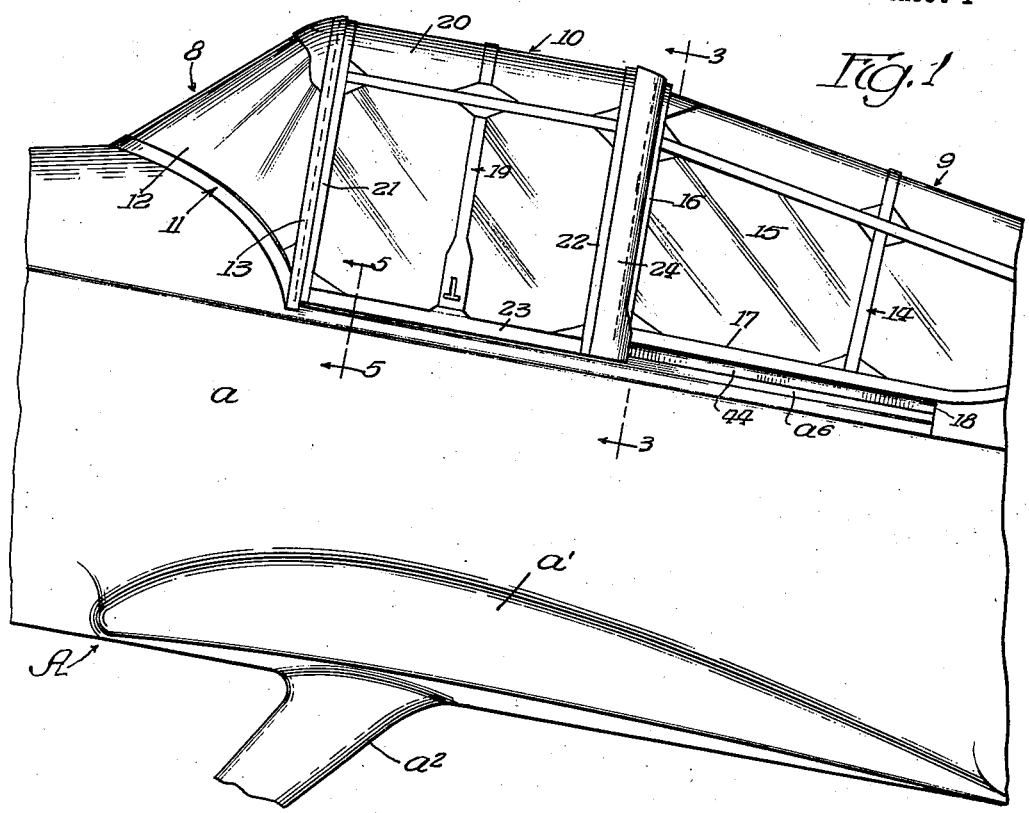
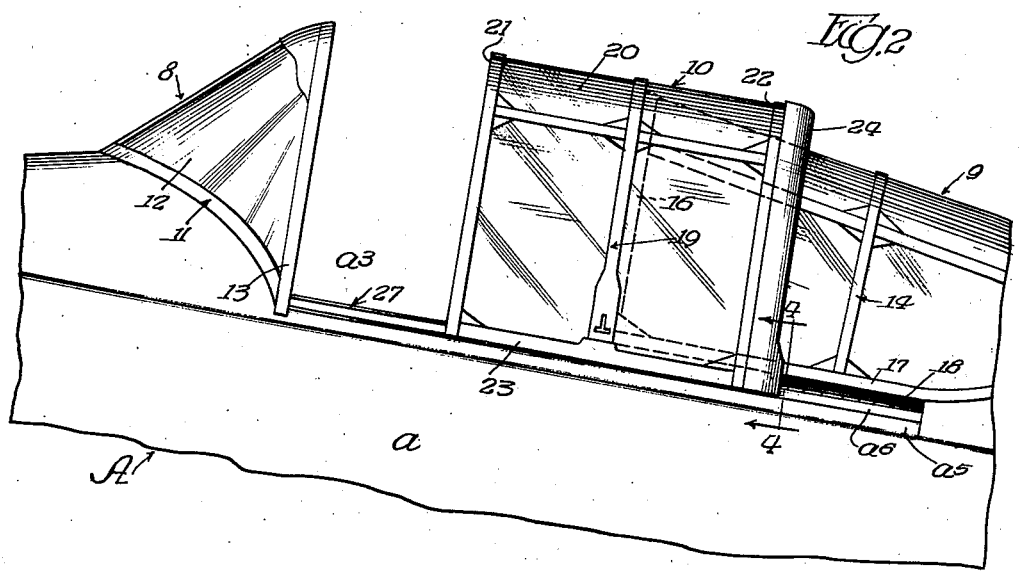
Inventor
John R. Jerman
By Fred Gerlach  Atty.

Sept. 8, 1942.  J. R. JERMAN  2,295,345
AIRPLANE COCKPIT ENCLOSURE
Filed Nov. 4, 1940   3 Sheets-Sheet 2
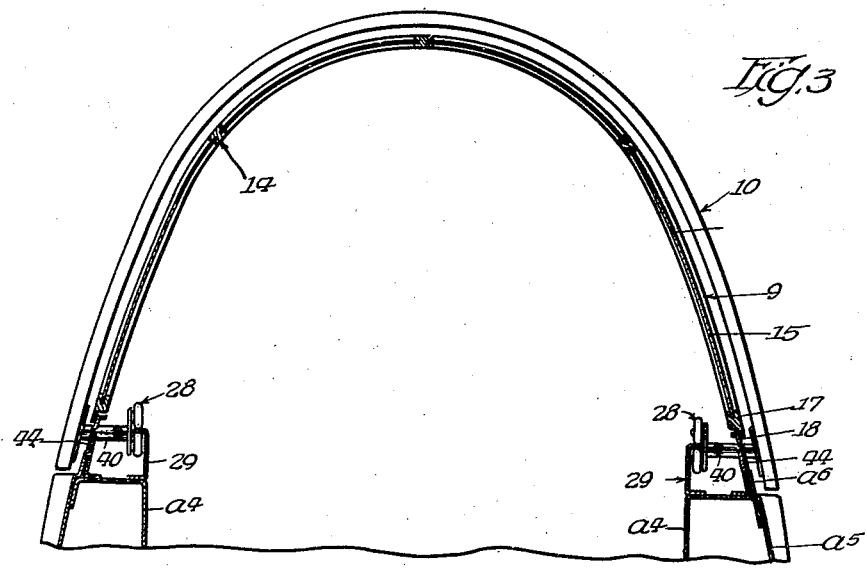
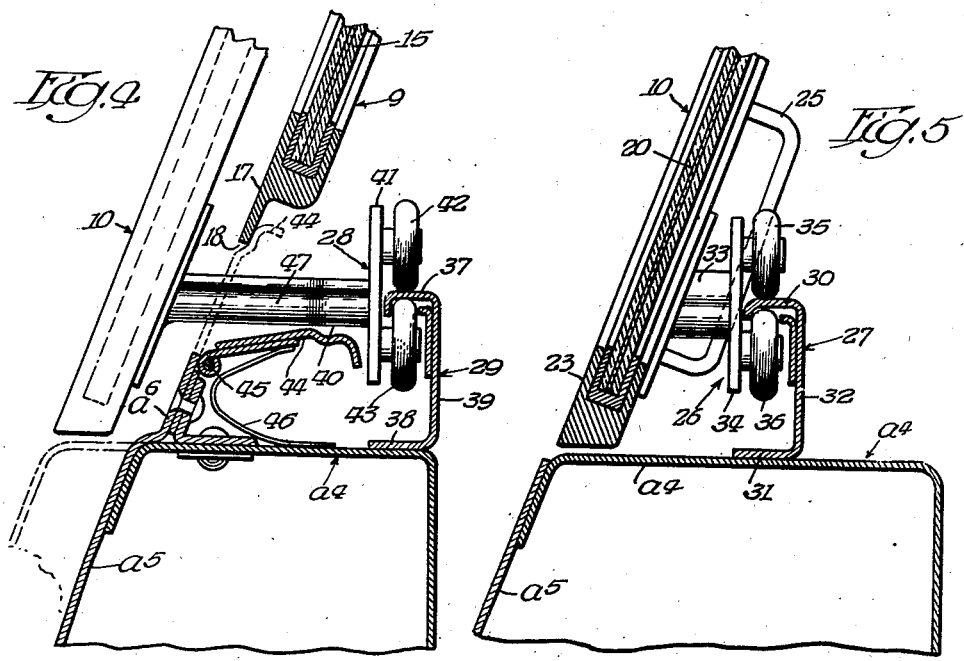
Inventor
John R. Jerman
By Fred Gerlach
Atty.

Sept. 8, 1942.    J. R. JERMAN    2,295,345
AIRPLANE COCKPIT ENCLOSURE
Filed Nov. 4, 1940    3 Sheets-Sheet 3
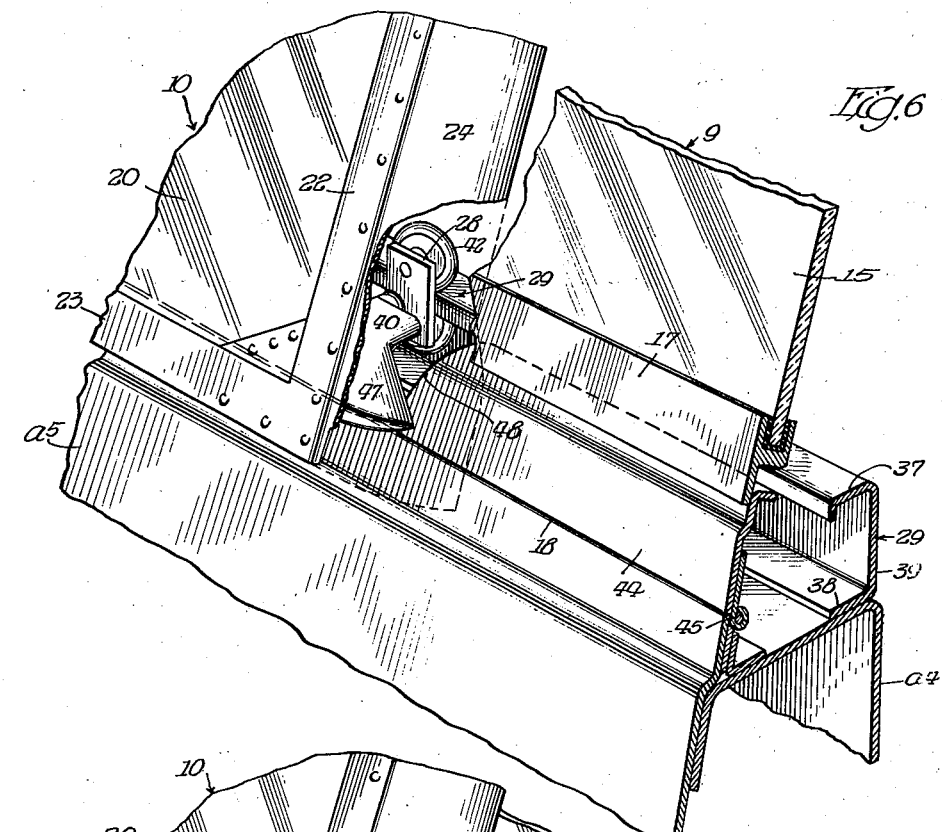
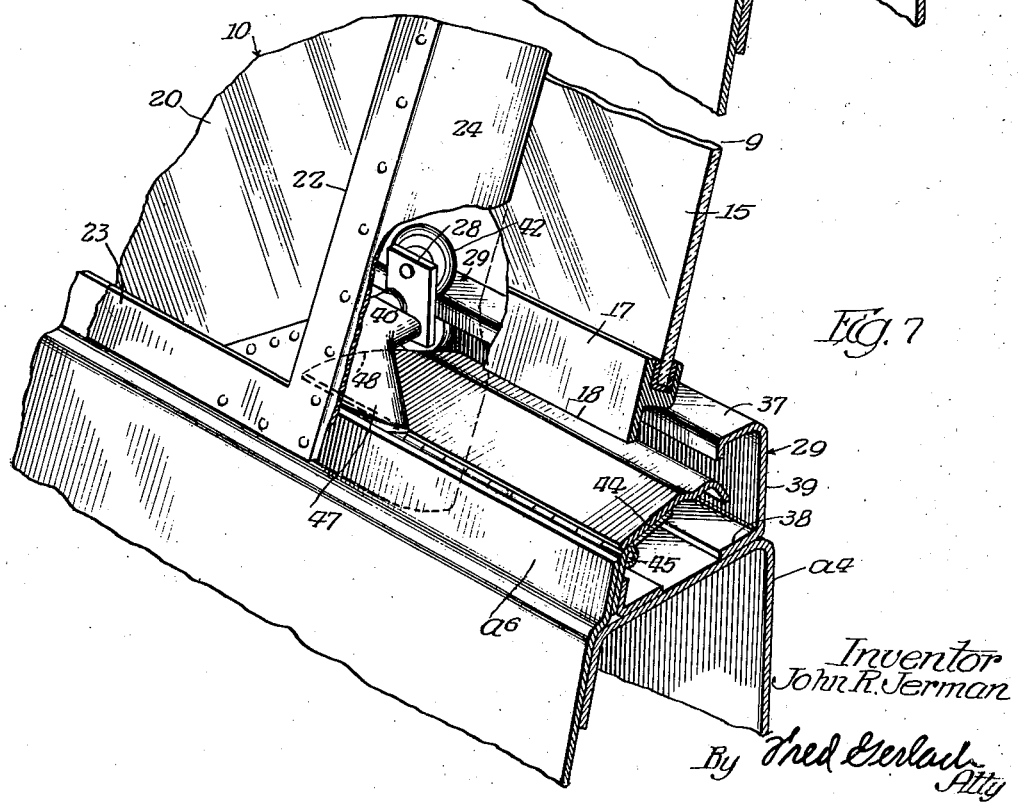
Inventor
John R. Jerman
By Fred Gerlach
Atty Patented Sept. 8, 1942

2,295,345

UNITED STATES PATENT OFFICE 2,295,345

AIRPLANE COCKPIT ENCLOSURE

John R. Jerman, Glendale, Calif., assignor to Vultee Aircraft, Inc., Downey, Calif., a corporation of Delaware Application November 4, 1940, Serial No. 364,151

8 Claims. (Cl. 244—121)

The present invention relates generally to cockpit enclosures for airplanes. More particularly the invention relates to that type of enclosure which is designed primarily for use in connection with an airplane having a cockpit in the fuselage thereof, and as its main or principal parts comprises—(1) a dome shaped windshield which is fixedly mounted on the forward part of the fuselage directly in front of the cockpit, (2) a transversely arched transparent canopy type section which is fixedly mounted on, and forms a part of, the aft portion of the fuselage and is positioned directly behind the rear part of the cockpit, and (3) a transversely arched transparent hatch type section which has substantially the same cross sectional shape as the cockpit facing portions of the windshield and the fixed canopy type section and is mounted on the fuselage so that it is shiftable back and forth between a closed position wherein it overlies the cockpit and fits between the windshield and the fixed section, and an open position wherein it overlies and is in telescopic relation with the fixed canopy type section.

In a cockpit enclosure of this type it has heretofore been customary or the general practice to employ as mounting means for the movable section a pair of front roller equipped trucks which are fixed to, and are disposed inwardly of, the front lower corners of the movable section and ride on a pair of laterally spaced substantially parallel tracks at the sides of the cockpit, and a pair of rear roller equipped trucks which are connected by brackets to, and are disposed inwardly of, the rear lower corners of the movable section and are mounted to travel on a pair of laterally spaced substantially parallel rear tracks along and outwards of the bottom margins of the fixed canopy type section. From the standpoint of practicability it has been found in practice that a cockpit enclosure having mounting means of the aforementioned character is objectionable for several reasons. In the first place the tracks for the rear roller equipped trucks are exteriorly disposed with respect to the fuselage of the airplane with which the enclosure is employed and hence tend to produce marked or pronounced aerodynamic drag when the airplane is in flight, thus preventing high speed of the airplane. Secondly, such tracks are susceptible to ice formation and in some instance become so incrusted with ice as to preclude opening of the movable section, i. e., rearward shift of such section into overlapped relation with the fixed canopy type section at the rear of the cockpit. Should the rear tracks become so incrusted with ice that it is impossible to shift the movable section into its open position the pilot or operator of the airplane is not in a position to make an emergency exit during flight of the airplane.

One object of the present invention is to provide an airplane cockpit enclosure which is an improvement upon, and is free from the objectionable features of, previously designed enclosures of the same general type or character.

Another object of the invention is to provide a cockpit enclosure of the type under consideration in which the tracks for the rear roller equipped trucks are mounted inwardly of the lower margins of the fixed canopy type section and the brackets for such trucks extend through and are free to move or travel in a pair of substantially parallel slots adjacent said lower margins of the fixed section.

Another object of the invention is to provide a cockpit enclosure of the last mentioned type which includes doors for closing the bracket accommodating slots at the lower margins of the fixed canopy type section when the movable section is in its closed position, i. e., over the cockpit.

A further object of the invention is to provide a cockpit enclosure of the type and character under consideration in which the doors for the slots embody spring means for urging them into their closed position and the brackets for supporting the rear roller equipped trucks are so designed that they operate automatically to shift the doors into their open position in connection with initial rearward movement of the movable hatch type section.

A still further object of the invention is to provide a cockpit enclosure which is generally of new and improved construction, reduces aerodynamic drag to a minimum and effectively and efficiently fulfills its intended purpose.

Other objects of the invention and the various advantages and characteristics of the present cockpit enclosure will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a fragmentary side elevation of an airplane having applied to the fuselage thereof a cockpit enclosure embodying the invention, the movable hatch type section of the enclosure being shown in its closed position, i. e., over the cockpit and in bridging relation with the windshield and the fixed canopy type section;

Figure 2 is another fragmentary side elevation of the airplane, the movable section of the enclosure being shown in its open position wherein it overlaps the fixed canopy type section at the rear of the cockpit;

Figure 3 is an enlarged vertical transverse section taken on the line 3—3 of Figure 1 and showing the construction and design of the rear roller equipped trucks and the manner in which the doors serve to close the side slots when the movable section of the enclosure is in its closed position;

Figure 4 is an enlarged vertical transverse section taken on the line 4—4 of Figure 2 and illustrating the manner in which the brackets for the rear roller equipped trucks serve to hold the slot closing doors in their open position when the movable section of the enclosure is in its open position;

Figure 5 is an enlarged vertical transverse section taken on the line 5—5 of Figure 1 and disclosing in detail the construction and arrangement of the front roller equipped trucks and the laterally spaced substantially parallel tracks on which such trucks ride or travel;

Figure 6 is a fragmentary perspective view showing the movable section of the enclosure in its closed position; and Figure 7 is a similar fragmentary perspective view showing the movable section after initial rearward shift thereof and illustrating in detail the manner in which the brackets for supporting the rear roller equipped trucks coact with the front ends of the slot closing doors to cam such doors into their open position.

The enclosure which is shown in the drawings constitutes the preferred embodiment of the invention and is illustrated in connection with an airplane A having an elongated fuselage $a$. The latter is of standard or conventional design and embodies a wing structure $a^1$ and a landing gear $a^2$. The fuselage of the airplane is adapted to be propelled through the air by way of an engine driven propeller (not shown). It has in the upper central portion thereof a pilot's cockpit $a^3$ together with suitable control and operating mechanism (also not shown). Along the upper central portion of its sides the fuselage $a$ is provided with a pair of laterally spaced rails $a^4$. These rails are disposed in parallel relation and constitute a part of the supporting or reinforcing structure of the fuselage. The front portions of the rails are located at the sides of the cockpit $a^3$ and the rear portions project a considerable distance to the rear of the cockpit. The fuselage, in addition to its reinforcing structure, comprises a skin or shell $a^5$. The rails $a^4$ are riveted or otherwise fixedly secured to the upper side portions of this shell. As shown in the drawings, the shell embodies along the rear portions of the rails $a^4$ a pair of laterally spaced parallel flanges $a^6$. These flanges extend inwards and then upwards above the rear portions of the rails. The front ends of the flanges $a^6$ terminate adjacent the central portions of the rails, i. e., at the back or rear portion of the cockpit $a^3$. The improved enclosure serves as a housing for the pilot of the airplane A and is designed to provide substantially unobstructed vision. It forms a part of the fuselage $a$ and embodies a windshield 8, a canopy type section 9 and a hatch type movable section 10.

The windshield 8 is located in front of the cockpit $a^3$ and is suitably fixed to the fuselage $a$. It is dome shaped and consists of a metallic frame structure 11 and a panel 12 of tough flexible transparent material, such, for example, as "Plexiglass." The frame structure serves as a supporting medium for the transparent panel 12 and includes at the rear portion thereof a substantially vertical semicircular strip 13. The latter defines the rear edge of the windshield 8 and projects upwardly from the front end extremities of the rails $a^4$. The windshield, as shown in Figures 1 and 2, overlies the front upper portion of the fuselage $a$ and is disposed directly in front of the cockpit $a^3$. It affords substantially unobstructed forward vision for the pilot of the airplane A and affords front protection to the pilot.

The fixed section 9 of the enclosure is located directly behind the cockpit $a^3$, as shown in Figure 1, and is substantially semi-cylindrical as far as shape or contour is concerned. It provides substantially unobstructed rear and side vision to the pilot of the airplane and consists of a metallic frame structure 14 and a transparent panel 15. The frame structure constitutes a supporting medium for the panel 15 and includes a substantially semi-circular front strip 16 and a pair of laterally spaced bottom strips 17. The rear end of the fixed section 9 of the enclosure projects rearwardly of the rear ends of the rails $a^4$ and is suitably secured in fixed relation with the contiguous portion of the fuselage $a$. The bottom strips 17 define the bottom margins of the fixed section 9 and overlie the rear portions of the rails $a^4$. They are positioned a slight distance above the upper edges of the flanges $a^6$ and form with the latter side slots 18. The front ends of the strips 17 terminate adjacent the front ends of the flanges $a^6$ and are connected to the ends of the substantially semi-circular front strip 16. Such strip, as shown in Figure 1, projects upwardly from the central portions of the rails $a^4$ and is in parallel relation with the semi-circular strip 13 of the frame structure 11 of the windshield 8. It defines the front margin of the fixed section and is located behind the cockpit $a^3$. As shown in the drawings, the front strip 16 of the frame 14 is aligned with the strip 13 and is substantially the same in shape as the latter.

The movable section 10 of the enclosure is shaped and designed to fit between the windshield 8 and the fixed canopy type section 9 and cover the cockpit $a^3$ when it is in its closed position. It serves as a removable closure for the cockpit and consists of a frame structure 19 and a panel 20 of flexible tough transparent material. The frame structure serves as a supporting medium for the panel and comprises semi-circular front and rear strips 21 and 22 and a pair of substantially horizontal bottom strips 23. The section 10 is transversely arched and corresponds in shape and curvature to the strip 13 of the windshield frame structure 11. The front strip 21 of the frame structure 19 is shaped conformably to the strip 13 and is adapted to abut against the latter, as shown in Figure 1, when the movable section 10 is in its closed position. The rear strip 22 is the same in size and shape as the front strip 21 and is adapted when the section 10 is in its closed position to overlie the front strip 16 of the frame structure 14 of the fixed canopy type section 9. It is held in aligned and parallel relation with the front strip 21 by the bottom strips 23 and carries a fairing strip 24. The latter overhangs and is arranged in sealed relation with the strip 16 when the movable section 10 is in its closed position (see Figure 1). The bottom strips 23 are disposed in parallel relation and overlie the rails $a^4$ of the airplane fuselage $a$. They define the bottom or lower margins of the transversely arched movable section 10 and have the front ends thereof fixedly secured to the ends of the front strip 21. The rear ends of the bottom strips 23 are fixedly connected to the rear ends of the strips 22. The section 10 is the same in cross section from end to end and is adapted to be shifted rearwards into an open position wherein it is in overlapped or telescopic relation with the front portion of the fixed canopy type section 9. When the section 10 of the cockpit enclosure is in its closed position, as shown in Figure 1, it coacts with the windshield 8 and the fixed section 9 to form a complete closure for the cockpit $a^3$. Said section 10, when in its closed or normal position, fully protects the pilot of the airplane A and affords substantially unobstructed vision through the top and sides thereof. A handle 25 on the inner face of the front strip 21 of the frame structure 19 permits the pilot readily to open and close the movable hatch type section 10. Such section is supported or mounted for shift or sliding movement back and forth between its open and closed positions by means of a pair of front roller equipped trucks 26, a pair of front tracks 27 for the trucks 26, a pair of rear roller equipped trucks 28 and a pair of rear tracks 29 for the trucks 28. The front trucks and tracks 26 and 27 serve slidably to support the front portion of the movable section 10 and the rear trucks 28 and tracks 29 serve slidably to support the rear portion of said section. The front tracks 27 are channel shaped in cross section and are mounted on, and extend lengthwise of, the front portions of the rails $a^4$. They are positioned along the central portions of the rails and consist of horizontally extending top and bottom legs 30 and 31 and vertically extending connecting webs 32. The bottom legs 31 are welded or otherwise fixedly secured to the rails $a^4$. The top legs 30 of the tracks 27 are held in spaced relation with the bottom legs by the webs 32. The trucks 26 are disposed inwardly of the front lower corners of the frame structure 19 of the movable hatch type section 10 and connected to such corners by horizontally extending brackets 33. They ride on the top legs 30 of the tracks 27 and consist of plates 34 and upper and lower rollers 35 and 36. The plates 34 extend vertically and are fixedly secured to the inner portions of the brackets 33. The upper rollers 35 ride on the upper faces of the top legs 30 of the tracks 27 and are rotatably mounted on spindles which project inwardly from the upper portions of the plates 34. The lower rollers 36 are adapted to travel along or ride on the lower or under faces of the top legs 30 and are rotatably mounted on spindles which project inwardly from the bottom portions of the plates 34 and are disposed beneath the spindles for the upper rollers 35. The tracks 27 extend rearwardly from the ends of the strip 13 of the windshield frame structure 11 and terminate at the central portions of the rails $a^4$. The rear tracks 29 are mounted on the inner parts of the rear end portions of the rails $a^4$ and are coextensive with, and are parallel to, the side slots 18. They are channel shaped in cross section and consist of horizontally extending top and bottom legs 37 and 38 and vertically extending connecting webs 39. The bottom legs 38 are welded or otherwise fixedly secured to the rails $a^4$. The top legs 37 are held in vertically spaced relation with the bottom legs 38 by the webs 39. The rear trucks 28 are disposed inwardly of the lower rear corners of the frame structure 19 of the movable section 10 and are connected to such corners by horizontally extending brackets 40. The latter extend through the side slots 18, as shown in Figures 4 and 7, and move lengthwise of such slots in connection with movement of the enclosure section 10 back and forth between its open and closed positions. The trucks 28 travel on the top legs 37 of the tracks 29 and consist of vertically extending plates 41 and upper and lower rollers 42 and 43. The plates 41 are fixedly secured to the inner ends of the brackets 40 and carry spindles on which the rollers 42 and 43 are rotatably mounted. The rollers 42 overlie the rollers 43 and are adapted to travel over and engage the upper faces of the top legs 37 of the tracks 29. The lower rollers 43 are vertically aligned with the upper rollers 42 and bear against and are adapted to travel along the under or lower faces of the top legs 37. The tracks 29 are positioned inwardly of the tracks 27.

In order to close the side slots 18 when the movable section 10 is in its closed position a pair of doors 44 is provided. These doors are horizontally elongated and have hinges 45 along the bottom margins thereof so that they are free to swing back and forth between a closed position wherein they fill the slots 18 and an open position wherein they extend substantially horizontally and permit the brackets 40 for the rear trucks 28 to move or travel in the slots 18. The hinges 45 are riveted to the flanges $a^6$, as shown in Figure 4. Springs 46 are associated with the hinges and are arranged so that they urge the doors 44 into their closed position. The upper margins of the doors 44 are inwardly offset and fit against the inner faces of the lower margins of the bottom strips 17 of the frame structure 14 when the doors are in their closed position. They serve to seal the upper portions of the slots and act as stop shoulders for limiting outward movement of the doors past their closed position. In order automatically to swing the doors 44 inwards and downwards into their open position in connection with initial shift of the movable hatch type section into its open position the brackets 40 for the rear trucks 28 are provided with triangular shaped cam elements 47 and the front ends of the doors are provided with coacting curved edges 48. When the movable section 10 is in its fully closed position the brackets 40 are located in front of the doors 44 and the doors are held in their closed position by means of the springs 46, as shown in Figure 6. During initial rearward movement of the section 10 in connection with shift thereof into its open position the elements 47 engage the front curved edges 48 of the doors, as shown in Figure 7, and cam the doors inwards into their open position. When the doors are in such position the brackets 40 are free to travel in the side slots 18 without any interference from the doors 44. When the section 10 is in its open position and it is desired to shift it into its closed or normal position the pilot of the airplane A grasps the handle 25 and shifts the same together with the section 10 forwardly. When the section 10 moves into its fully closed position the triangular cam elements 47 on the brackets 40 move out of engagement with the front ends of the doors 44 and thus release the doors so that they are closed by the springs 46. The doors are essentially self-closing. The elements 47 constitute or exemplify simple means for automatically swinging the doors 44 into their open position in connection with initial rearward shift of the section 10. As shown in Figure 6, the doors 44 when in their closed position completely fill the side slots 18 and form a smooth exterior surface between the outer faces of the flanges $a^6$ and the bottom strips 17.

The herein described cockpit enclosure effectively and efficiently fulfills its intended purpose and may be readily opened and closed. By reason of the fact that the rear tracks are positioned interiorly of the fixed section 9 and the enclosure includes doors 44 for the side slots 18 aerodynamic drag is reduced to a minimum when the airplane A is in flight with the movable section 10 in its closed position. Because the slots 18 are automatically sealed or closed by the doors when the section 10 is shifted forwards into its closed position they cannot acquire or become clogged by an ice formation which would preclude emergency or other opening of the section 10.

The invention is not to be understood as restricted to the details set forth since these may be modified within the scope of the appended claims without departing from the spirit and scope of the invention.

Having thus described the invention what I claim as new and desire to secure by Letters Patent is:

1. In combination with a vehicle having a cockpit therein, an enclosure for the cockpit comprising a transversely arched section mounted fixedly on the vehicle adjacent the cockpit and having longitudinal slots along the bottom portions of its sides, a transversely arched hatch type section shiftable longitudinally back and forth between a closed position wherein it overlies the cockpit and forms a continuation of the fixed section and an open position wherein it is in overlapped relation with said fixed section, a slide type mounting for the shiftable section including elements connected to the bottom portions of the sides of said shiftable section and extending inwardly through and slidable along said slots, and rigid movably mounted doors for closing said slots when the shiftable section is in its closed position.

2. In combination with an airplane fuselage having a cockpit therein, an enclosure for the cockpit comprising a dome shaped windshield mounted on the fuselage in front of the cockpit and having an arched rear margin, a transversely arched canopy type section fixed to the fuselage behind the cockpit and in alignment with the windshield and having substantially parallel horizontally extending slots along the bottom portions of its sides, a transversely arched hatch type section shiftable back and forth between a closed position wherein it overlies the cockpit and fits between the windshield and the fixed section and an open position wherein it is in overlapped relation with said fixed section, a slide type mounting for the shiftable section including elements connected to and projecting inwardly from the rear lower corners of said shiftable section and adapted in connection with shift of the last mentioned section back and forth between its open and closed position to travel in the slots, and hinged doors for closing said slots when the shiftable section is in its closed position.

3. In combination with an airplane fuselage having a cockpit therein, an enclosure for the cockpit comprising a dome shaped windshield mounted on the fuselage in front of the cockpit, a hollow transversely arched canopy type section mounted fixedly on the fuselage behind the cockpit and in alignment with the windshield and having opposed longitudinal slots along the bottom portions of its sides, a transversely arched hatch type section shiftable longitudinally back and forth between a closed position wherein it overlies the cockpit and fits between the windshield and the fixed section and an open position wherein it is in overlapped relation with said fixed section, a slide type mounting for the shiftable section including a pair of laterally spaced tracks disposed in said fixed section inwardly of, and in parallel relation with, the slots and in the plane of said slots, and brackets connected to, and projecting inwardly from, the rear lower corners of the shiftable section extending through and slidable lengthwise of the slots and provided with roller equipped trucks mounted for travel on the tracks, and rigid movably mounted doors for completely closing or sealing the slots when the shiftable section is in its closed position.

4. In combination with a vehicle having a cockpit therein, an enclosure for the cockpit comprising a transversely arched section mounted fixedly on the vehicle adjacent the cockpit and having longitudinal slots along the bottom portions of its sides, a transversely arched hatch type section shiftable longitudinally back and forth between a closed position wherein it overlies the cockpit and forms a continuation of the fixed section and an open position wherein it is in overlapped relation with said fixed section, a slide type mounting for the shiftable section including elements connected to the bottom portions of the sides of said shiftable section and extending inwardly through and slidable along said slots, doors for closing the slots, and means for automatically closing the doors upon shift of the shiftable section into its closed position and opening such doors upon initial movement of said shiftable section in connection with shift thereof into its open position.

5. In combination with a vehicle having a cockpit therein, an enclosure for the cockpit comprising a transversely arched section mounted fixedly on the vehicle adjacent the cockpit and having longitudinal slots along the bottom portions of its sides, a transversely arched hatch type section shiftable longitudinally back and forth between a closed position wherein it overlies the cockpit and forms a continuation of the fixed section and an open position wherein it is in overlapped relation with said fixed section, a slide type mounting for the shiftable section including elements connected to the bottom portions of the sides of said shiftable section and extending inwardly through and slidable along said slots, doors for closing the slots, spring means for urging the doors into their closed position, and cam means associated with said elements for camming the doors into their open position and holding the doors in such position during shift of the shiftable section into its open position.

6. An airplane comprising a fuselage having an access opening therein and in addition an external slot leading away from the opening, a closure member for the opening shiftable back and forth between a normal closed position wherein it covers the opening and an open position wherein it is in overlapped relation with the slot equipped portion of the fuselage, a slide type mounting for the member including an inwardly extending element on the member extending inwardly through and slidable along the slot, a door for closing the slot, and means for automatically closing the door upon shift of the member into its closed position and opening said door upon initial movement of said shiftable member in connection with shift thereof into its open position.

7. An airplane comprising a fuselage having an access opening therein and in addition an external slot leading away from the opening, a closure member for the opening shiftable back and forth between a normal closed position wherein it covers the opening and an open position wherein it is in overlapped relation with the slot equipped portion of the fuselage, a slide type mounting for the member including an inwardly extending element on the member extending inwardly through and slidable along the slot, a door for closing or sealing the slot, spring means for urging the door into its closed position, and cam means associated with said element for camming the door into its open position and holding the door in such position during shift of the closure member into its open position.

8. An airplane comprising a fuselage having a cockpit therein and in addition a pair of substantially parallel external side slots leading from the sides of the cockpit, a substantially transparent hatch type closure member for the cockpit shiftable longitudinally back and forth between a closed position wherein it overlies and covers the cockpit and an open position wherein it is in overlapped relation with the slot equipped portion of the fuselage, a slide type mounting for the member including a pair of elements fixed to, and projecting inwardly from, the member and extending through and slidable along the slots respectively, hinged self-closing doors for the slots, and cam means forming a part of the elements for automatically camming the doors into their open position in connection with initial movement of the member when it is shifted into its open position.

JOHN R. JERMAN.